(12) United States Patent
Nguyen et al.

(10) Patent No.: US 9,826,302 B2
(45) Date of Patent: Nov. 21, 2017

(54) ELECTRONIC DEVICE WITH MAGNETICALLY STOWABLE SPEAKER ASSEMBLIES

(71) Applicant: Motorola Mobility LLC, Chicago, IL (US)

(72) Inventors: Thinh T Nguyen, Suwanee, GA (US); Daniel Young Yoon, San Jose, CA (US)

(73) Assignee: Motorola Mobility LLC, Chicago, IL (US)

( * ) Notice: Subject to any disclaimer, the term of this patent is extended or adjusted under 35 U.S.C. 154(b) by 38 days.

(21) Appl. No.: 14/847,055

(22) Filed: Sep. 8, 2015

(65) Prior Publication Data
US 2017/0070801 A1    Mar. 9, 2017

(51) Int. Cl.
| H04R 1/10 | (2006.01) |
| H04R 3/00 | (2006.01) |
| H04M 1/60 | (2006.01) |
| H04R 5/033 | (2006.01) |

(52) U.S. Cl.
CPC .......... H04R 1/105 (2013.01); H04M 1/6066 (2013.01); H04R 1/1041 (2013.01); H04R 3/00 (2013.01); H04R 5/0335 (2013.01); H04R 1/1016 (2013.01); H04R 2201/107 (2013.01); H04R 2420/07 (2013.01); H04R 2460/17 (2013.01)

(58) Field of Classification Search
CPC .... H04R 1/1016; H04R 1/1041; H04R 1/105; H04R 2201/107; H04R 3/00
USPC .............. 381/74, 87, 336, 91, 104, 122, 123
See application file for complete search history.

(56) References Cited

U.S. PATENT DOCUMENTS

| 7,072,476 | B2 | 7/2006 | White et al. | |
|---|---|---|---|---|
| 7,149,552 | B2 | 12/2006 | Lair | |
| 8,498,425 | B2 | 7/2013 | Graylin | |
| 2005/0288067 | A1* | 12/2005 | Wainwright | H04M 19/04 455/567 |
| 2011/0222701 | A1* | 9/2011 | Donaldson | H04R 1/1083 381/74 |
| 2014/0211959 | A1* | 7/2014 | Boyajian | H04R 1/1041 381/74 |
| 2014/0273546 | A1 | 9/2014 | Harmon et al. | |
| 2014/0341389 | A1 | 11/2014 | Pavlov et al. | |
| 2015/0146880 | A1* | 5/2015 | Boni | H04R 1/1008 381/74 |
| 2016/0044401 | A1* | 2/2016 | Lee | H04R 1/1041 381/74 |

(Continued)

*Primary Examiner* — Vivian Chin
*Assistant Examiner* — Friedrich W Fahnert
(74) *Attorney, Agent, or Firm* — Philip H. Burrus, IV

(57) ABSTRACT

An electronic device includes a body housing one or more electronic circuits. A first actuation device and a second actuation device are disposed along the body. When actuated, the actuation devices control the operation of the one or more electronic circuits. A first speaker assembly and a second speaker assembly are operable with the one or more electronic circuits. One or both of the first actuation device or the second actuation device comprising a magnet, while one or both of the first speaker assembly or the second speaker assembly comprising a ferromagnetic material to selectively magnetically couple the first speaker assembly and the second speaker assembly to the first actuation device or the second actuation device, respectively.

19 Claims, 6 Drawing Sheets

(56) References Cited

U.S. PATENT DOCUMENTS

2016/0098138 A1\* 4/2016 Park ................... G06F 3/0416
  345/173
2016/0261676 A1\* 9/2016 Nishimoto ............ G06Q 30/06

\* cited by examiner

ELECTRONIC DEVICE WITH MAGNETICALLY STOWABLE SPEAKER ASSEMBLIES

BACKGROUND

Technical Field

This disclosure relates generally to electronic devices, and more particularly to electronic devices having speaker assemblies.

Background Art

Wireless headsets are commonly used with many portable electronic devices. For example, wireless headsets can be used with a smartphone that includes a multimedia player, such as an MPEG-3 music player, to listen to music. Modern headsets take many forms, including over the ear clip on devices and over the head headphones. More compact headsets are manufactured as "in the ear" or "in the ear canal" earbuds. Earbuds generally include small speakers and fit into either the folds of the human ear or into the ear canal itself. While these small speakers are capable of producing dazzling sound with relatively low power, they are easy to lose, drop, or damage. It would be advantageous to have an improved electronic device that works to prevent speaker assemblies for use with the ear from being lost, dropped, or damaged. Moreover, it would be even more advantageous if the improved electronic device suitable for use by fashion conscious users.

Figure 1:
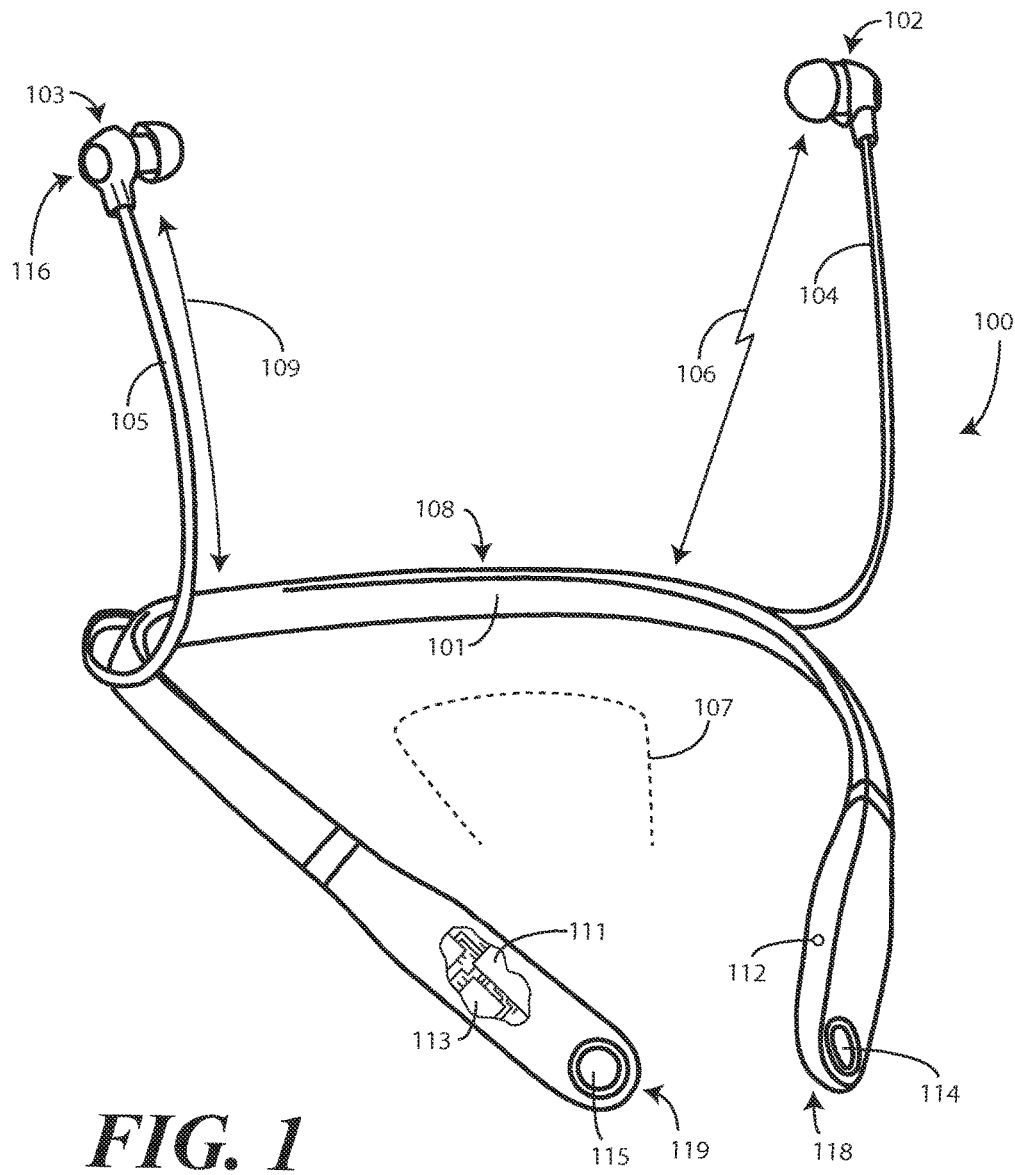
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to electronic devices having speaker assemblies, such as ear bud speaker assemblies. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that is configured as a wireless headset in one or more embodiments. In one embodiment, the electronic device includes a body and one or more speaker assemblies. The body can include one or more electronic circuits to control the operation of the wireless headset. For example, the body can comprise one or more wireless communication circuits, one or more processors, one or more microphones, or other electrical components. In one embodiment, the body also includes at least one actuation device disposed along the body to, when actuated, affect operation of the one or more electronic circuits. Illustrating by example, an actuation device may comprise a push button, disposed at the end of the body, that when pushed actuates a microphone.

The one or more speaker assemblies are operable with the one or more electronic circuits. In one embodiment, the one or more speaker assemblies are wirelessly in communication with the body. In other embodiments, the one or more speaker assemblies are tethered to the body by electrical conductors. In one or more embodiments, each speaker assembly comprises an ear bud that includes an ear insertion stem to insert into the ear canal of a wearer. In one embodiment, each ear bud is sufficiently compact as to seat flush or below the outer surface/end of the tragus portion of the ear.

To provide an option for stowing the speaker assemblies when not in use, in one embodiment each actuation device can be magnetically coupled to a corresponding speaker assembly. For example, one of the at least one actuation device or the one or more speaker assemblies can comprise a magnet, which may be an earth magnet, manufactured magnet, electromagnet, or other magnetic device. At the same time, another of the at least one actuation device or the one or more speaker assemblies can comprise one of a ferromagnetic material or another magnet to selectively, magnetically couple to the one of the at least one actuation device or the one or more speaker assemblies. The term "selectively" is used herein to describe an action that is selectable by a user, e.g., the user can choose to magnetically couple a speaker assembly to an actuation device. Alternatively, the user can choose to magnetically decouple the speaker assembly from the actuation device. The inclusion of magnetically coupled actuation devices and speaker assemblies advantageously provides a sleek and stylish way to attractively stow ear bud speaker assemblies when not in use.

Turning now to FIG. 1, illustrated therein is one explanatory embodiment of an electronic device 100 configured in accordance with one or more embodiments of the disclosure. In one or more embodiments, the electronic device 100 comprises a wireless, hands-free communication device such as a Bluetooth.sup.™ enabled headset for example. As shown in FIG. 1, in one embodiment the electronic device 100 includes a body 101 and one or more speaker assemblies 102,103.

In this embodiment, the electronic device 100 includes a first speaker assembly 102 and a second speaker assembly 103. In one embodiment, each speaker assembly each comprises an ear bud speaker assembly having a housing 116 and an ear insertion stem 117. The first speaker assembly 102 can be for insertion into a first ear of a user, while the second speaker assembly 103 can be inserted into the second ear of a user to deliver stereo audio. While two speaker assemblies 102,103 are shown in FIG. 1, in other embodiments only one speaker assembly will be operable with the electronic components disposed within the body 101.

In this illustrative embodiment, each of the first speaker assembly 102 and the second speaker assembly 103 is tethered 109 to the body 101 by a first electrical conductor 104 and a second electrical conductor 105, respectively. However, embodiments of the disclosure are not so limited. In other embodiments, each of the first speaker assembly 102 and the second speaker assembly 103 can be in wireless communication 106 with one or more electronic circuits operating within the body 101 of the electronic device 100. In this illustrative embodiment the first electrical conductor 104 and the second electrical conductor 105 are attached to the rear 108 of the body 101 and extend with enough length so that they comfortably reach a user's ears.

In one embodiment, the body 101 defines a wearable body that is designed to be worn around the neck of a user above the user's shoulders. Configuring the body 101 in this fashion allows the first speaker assembly 102 and the second speaker assembly 103 to remain as compact as possible, as the majority of electronic circuits operating within the electronic device 100, including energy storage devices, are disposed within the body 101 of the electronic device 100. The first speaker assembly 102 and the second speaker assembly 103 then need only house acoustic transducers to deliver acoustic energy to the ear of the user. Configuring the body 101 in this fashion also allows the weight of the electronic device 100 to rest on the user's shoulders rather than create a moment about the user's ears.

In one embodiment, the body 101 is configured to define a U-shape frame 107 that can be worn about a wearer's neck, and that rests on a user's shoulders. The body 101 can be manufactured from a pliant material such as a pliant thermoplastic such that the U-shape can be expanded and diminished when placing the body about the wearer's neck. Accordingly, in one or more embodiments the body 101 can be bendable, flexible, and/or adjustable to accommodate users with differing proportions. In one or more embodiments, the body 101 can include a hinge or other bendable joint that allows it to fold.

In one or more embodiments, the body 101 houses one or more electronic circuits 110. The electronic circuits 110 can include a control circuit 111, a wireless communication circuit 113, one or more microphones 112, and other circuit elements. The one or more electronic circuits 110 can also include energy storage devices such as batteries, and other electronics disposed therein.

The control circuit 111 can include one or more processors, such as an application processor and, optionally, one or more auxiliary processors. One or both of the application processor or the auxiliary processor(s) can be a microprocessor, a group of processing components, one or more Application Specific Integrated Circuits (ASICs), programmable logic, or other type of processing device. The application processor and the auxiliary processor(s) can be operable with the various components disposed within the body 101.

In one embodiment, the control circuit 111 can be configured to process and execute executable software code to perform the various functions of the electronic device 100. One of the electronic components can comprise a storage device, such as memory. The memory can optionally store the executable software code used by the control circuit 111 during operation. The program instructions may alternatively be stored on-board the control circuit. The memory devices may include either or both static and dynamic memory components, may be used for storing embedded code.

In one embodiment, one electrical component comprises a wireless communication circuit 113 configured for wireless communication with one or more other devices or networks. In one embodiment, the other device can be a wireless communication device such as a mobile telephone. However, it will be clear to those of ordinary skill in the art having the benefit of this disclosure that the invention is not so limited. The other device could also be a personal computer having wireless capabilities that is configured to establish Voice Over Internet Protocol (VoIP) communications.

A chip antenna of the wireless communication circuit 113 can facilitate wireless communication with the other networks or devices. The networks can include a local area network and/or personal area network. The communication circuit may utilize wireless technology for communication, such as, but are not limited to, peer-to-peer or ad hoc communications such as HomeRF, Bluetooth and IEEE 802.11 (a, b, g or n). The wireless communication circuit 113 can include a receiver, a transmitter, or transceiver, one or more antennas, and combinations thereof.

In one embodiment, the wireless communication circuit 113 includes a wireless, hands-free communication device transceiver capable of communicating by transmitting electronic signals to a remote electronic device. For example, the wireless, hands-free communication device transceiver may be a local area, low power transmitter capable of sending electronic signals including voice and software control commands to, for example, a wireless communication device.

In one embodiment, at least one actuation device 114,115 is disposed along the body 101 to, when actuated, affect operation of the one or more electronic circuits 110. Here, the electronic device 100 includes a first actuation device 114 and a second actuation device 115. While two actuation devices 114,115 are used in this application, it will be clear to those of ordinary skill in the art having the benefit of this disclosure that more actuation devices, or fewer actuation devices, depending upon application. In this illustrative embodiment, the body 101 defines a first end 118 and a second end 119, and the first actuation device 114 is disposed at the first end 118 while the second actuation device 115 is disposed at the second end 119.

Figure 2:
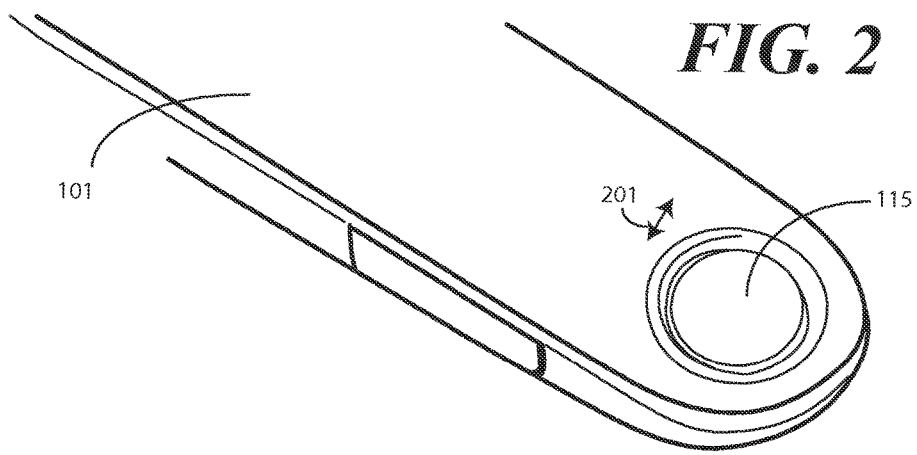
FIG. 2 illustrates an end of a body of an explanatory electronic device with an actuation device in accordance with one or more embodiments of the disclosure.

FIG. 2 illustrates a magnified view of actuation device 115. Referring now to FIGS. 1 and 2, in one embodiment each actuation device 114,115 comprises a push button that is to translate 201 into the body 101 to actuate an electromechanical switch (described in more detail with reference to FIG. 4) to affect the operation of the one or more electronic circuits 110. In one embodiment, the one or more electronic circuits 110 include processing circuitry associated with the actuation devices 114,115 to detect when a user presses an actuation device 114 into the body 101.

In one embodiment, the actuation devices 114,115 are capable of actuating the various functions of the electronic device 100. In one or more embodiments, one or both actuation devices 114,115 can each comprise a multi-function button that controls multiple operations. In one or more embodiments designers may prefer to employ only one or a few buttons disposed along the body 101 for multiple functions to keep the device small. Illustrating by example, actuation device 115 may work to both answer and hang-up incoming calls depending upon the current state of the electronic device 100. In one illustrative embodiment, the operations controlled by the actuation devices 114,115 can include actuation of the one or more microphones 112 or audio playback operation when the electronic device 100 is operable to delivery audio such as music through the speaker assemblies 102,103.

Figure 3:
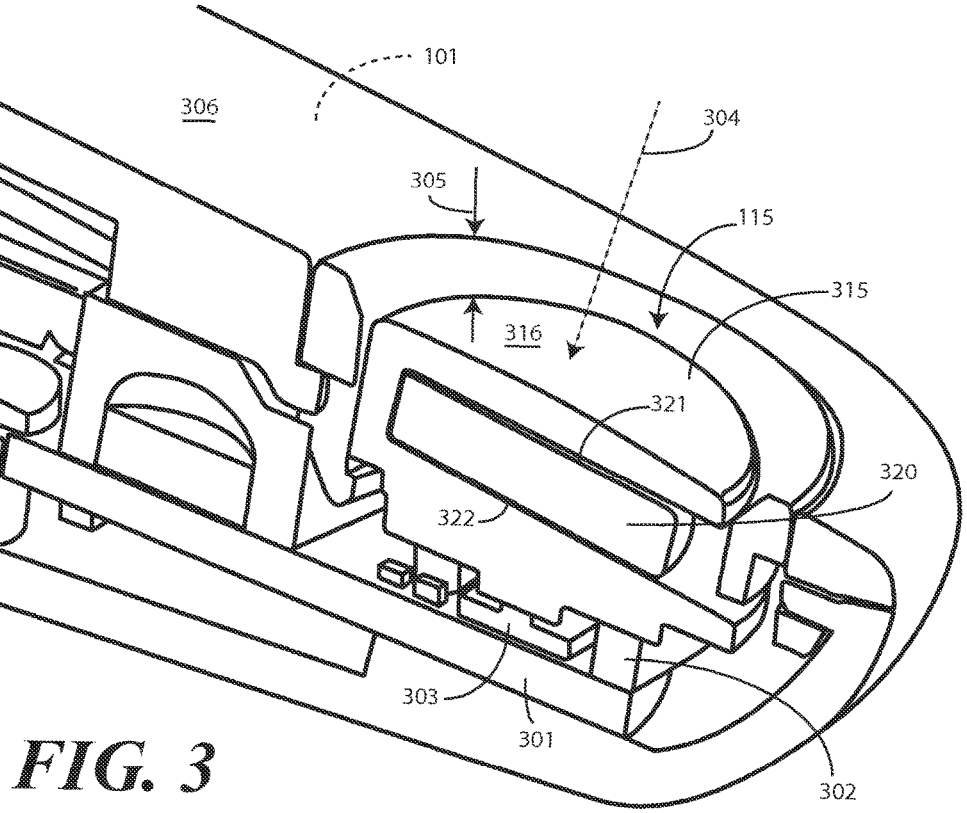
FIG. 3 illustrates a sectional view of an end of a body of an explanatory electronic device with an actuation device in accordance with one or more embodiments of the disclosure.

Turning now to FIG. 3, illustrated therein is a sectional view 300 of actuation device 115. In this illustrative embodiment, actuation device 115 comprises a push button 315 biased away from a printed circuit board 301 by a compressible gasket 302. In one embodiment, the push button 315 is manufactured from a rigid material such as a rigid thermoplastic. In one embodiment the compressible gasket 302 comprises a compressible foam pad disposed about an electromechanical switch 303 to bias the push button 315 away from the electromechanical switch 303.

In this illustrative embodiment, the electromechanical switch 303 is disposed between the push button 315 and the printed circuit board 301. When the push button 315 is pressed 304 into the body 101, the compressible gasket 302 compresses. This compresses the electromechanical switch 303 thereby delivering an actuation signal to the one or more electronic circuits (110). As shown in FIG. 3, in one embodiment the push button 315 is recessed 305 below a surface 306 of the body 101.

Figure 4:
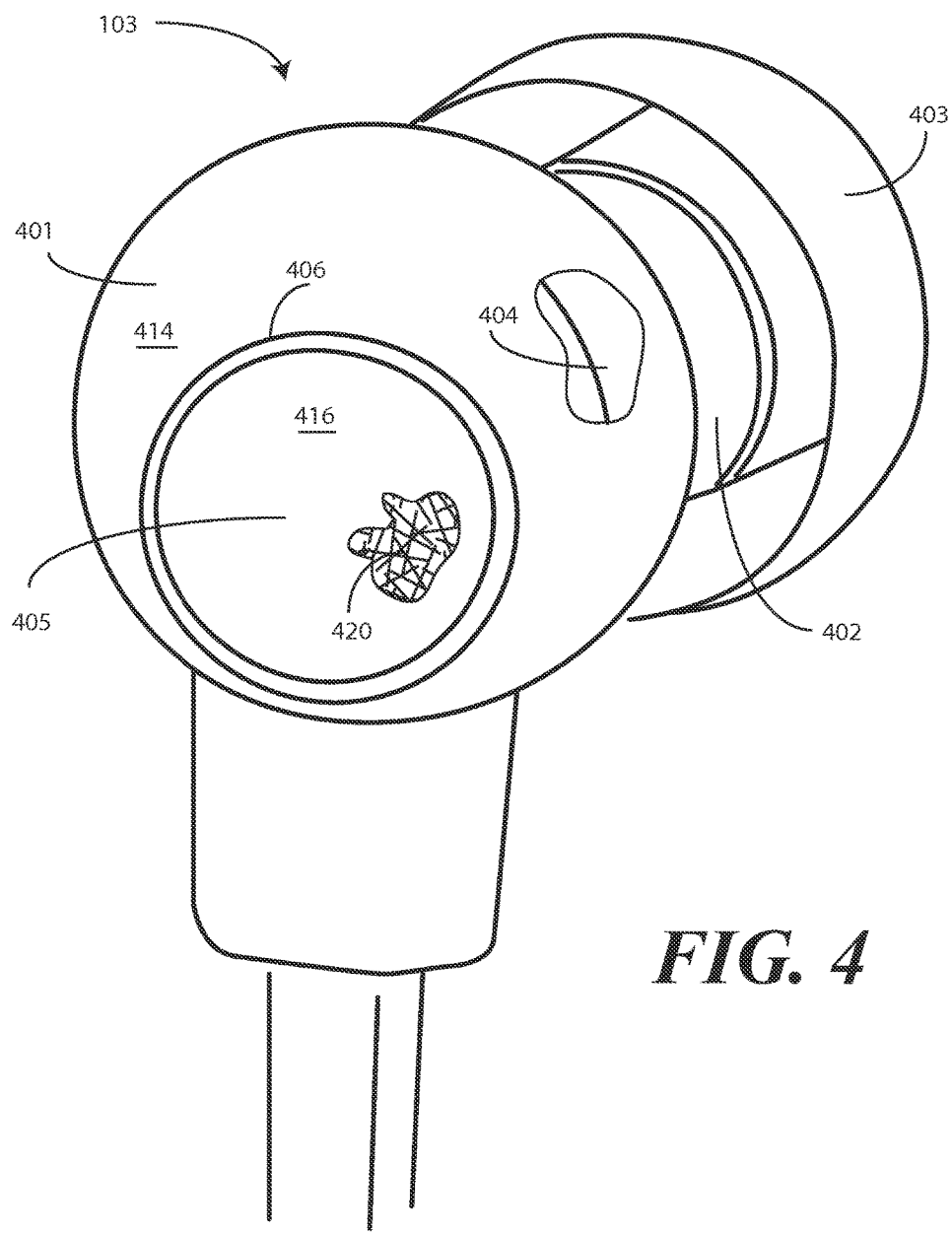
FIG. 4 illustrates an ear bud speaker assembly in accordance with one or more embodiments of the disclosure.

Turning now to FIG. 4, illustrated therein is a magnified image of one of the speaker assemblies 103. In this illustrative embodiment, the speaker assembly 103 comprises an ear bud speaker having a housing 401 and an ear canal insertion stem 402. Here the ear canal insertion stem 402 terminates at a soft, silicon compression fitting earpiece cover 403 to retain the ear canal insertion stem 402 within a user's ear canal. An acoustic driver 404 is disposed within the housing 401, which may be manufactured from a rigid thermoplastic material. The acoustic driver delivers acoustic energy through an axial port defined within the ear canal insertion stem 402.

In one embodiment, the acoustic driver 404 comprises a balanced armature speaker. The acoustic driver 404 can be electrically coupled to the one or more electrical circuits (110) disposed within the body (101). The acoustic driver 404 is a speaker in one embodiment that will serve as the acoustic output of the electronic device (100) that delivers sound through the ear canal insertion stem 402 to a user's eardrum. In one or more embodiments the housing 401 defines an acoustic chamber for the acoustic driver 404.

In one embodiment, the housing 401 of the speaker assembly further includes a medallion 405. In one embodiment, the medallion 405 is disposed opposite the housing 401 from the ear canal insertion stem 402 along the backside of the housing 401. The medallion 405 can be decorative in one or more embodiments. For example, the medallion 405 can include a logo, brand, instructional information, or other information. In other embodiments, the medallion 405 can be non-decorative. In still other embodiments, the medallion 405 can be integrated into the housing so as not to be visible.

The medallion 405 can be continuous with the housing 401, inserted into the housing 401, printed along the housing 401, deposited along the housing 401, molded into the housing 401, or created in other ways. In one embodiment, the medallion 405 is a separate piece of material that is disposed within a medallion recess 406 disposed along the housing 401. As will be explained in more detail below, the housing 401 can include a ferromagnetic material 420. Accordingly, in one or more embodiments the ferromagnetic material 420 can be deposited along a surface 414 of the housing 401 to define the medallion 405. Other techniques for manufacturing the medallion 405 will be obvious to those of ordinary skill in the art.

Embodiments of the disclosure contemplate that while small, in-ear speaker assemblies 103 like that shown in FIG. 4 are capable of producing dazzling sound with relatively low power, they can flop around the body (101) and can catch on various objects. Additionally, if they are dangling from the body (101), they can become damaged. Advantageously, embodiments of the disclosure provide a solution to this issue that works to prevent speaker assemblies for use with the ear from being lost, dropped, or damaged. Specifically, in one or more embodiments, the actuation devices (114,115) can be configured as bays in which the speaker assemblies 103 can be stowed when not in use. In one embodiment, the actuation devices (114,115) and speaker assemblies 103 can be configured to selectively magnetically couple to each other so that the speaker assemblies 103 can be stowed within recesses atop the actuation devices (114,115) when not in use.

Referring now to FIGS. 3 and 4, in one or more embodiments, one of the actuation device 115 or the speaker assembly 103 comprises a magnet, while another of the actuation device 115 or the speaker assembly 103 comprises a ferromagnetic material, such as stainless steel and the like, or another magnet. The magnet and the ferromagnetic material or other magnet attract magnetically, thereby allowing selective coupling of the speaker assembly 103 to the actuation device 115.

Illustrating by example, in the explanatory embodiment of FIGS. 3 and 4, the actuation device 115 comprises a magnet 320. The medallion 405 of the speaker assembly 103 can then either include—or be made from—another magnet. Alternatively, the medallion 405 can be manufactured from—or can comprise—a ferromagnetic material 420. When the actuation device 115 includes the magnet 320, and the medallion includes the ferromagnetic material 420, the speaker assembly is capable of selectively magnetically coupling to the actuation device 115 when not in use.

Note that while the medallion 405 includes the ferromagnetic material 420 in this illustrative embodiment, the inclusion of a medallion is not required. In other embodiments, the ferromagnetic material 420 could be disposed along the surface of the housing 401 of the speaker assembly 103. Where the medallion 405 is included, the ferromagnetic material 420 can be disposed along the surface of the medallion 405, or can alternatively be integrated into the medallion 405.

Also note that while the actuation device 115 has the magnet 320 and the speaker assembly 103 includes the ferromagnetic material 420, the system could be configured in the opposite convention, with the actuation device 115 comprising the ferromagnetic material 420—disposed either on the surface of the push button 315 or integrated into the push button 315—while the speaker assembly 103 comprises the magnet 320. For example, the medallion 405 itself could comprise the magnet 320 while the surface of the push button 315 is coated with the ferromagnetic material 420.

In still another embodiment, both the actuation device 115 and the speaker assembly 103 can comprise a magnet 320. For example, the medallion 405 itself could comprise a first magnet, while a second magnet is integrated into the push button 315. These magnets could attract to selectively couple the speaker assembly 103 to the actuation device 115. In still another embodiment, the magnet 320 in the push button 315 could attract to a magnet of the acoustic driver 404 to selectively couple the speaker assembly 103 to the push button 315. Other methods for selectively coupling the speaker assembly 103 to the push button 315 will be obvious to those of ordinary skill in the art having the benefit of this disclosure.

Thus, in one or more embodiments one of the actuation device 115 or the speaker assembly 103 comprises a magnet 320. Another of the actuation device 115 or the speaker assembly 103 comprises one of a ferromagnetic material 420 or another magnet to selectively magnetically couple to the one of the at least one actuation device or the one or more speaker assemblies. In the illustrative embodiment of FIGS. 3-4, the actuation device 115 includes the magnet 320, while the speaker assembly 103 comprises the ferromagnetic material 420. However, the opposite could be true, or the speaker assembly 103 could comprise a second magnet. Regardless of embodiment, the actuation device 115 can now perform dual functions: First, it can activate the electromechanical switch 303 when pressed 304 into the body. Second, it can provide a "landing pad," which is recessed 305 in one embodiment, for speaker assembly 103 storage. Where the magnet 320 is disposed within the push button 315, it can serve as a locating feature to draw the medallion 405 to the proper stowing location. Also, where the medallion 405 is included and is visibly distinct, it provides a mnemonic reminder as to which portion of the speaker assembly 103 should be selectively coupled to the push button 315.

The magnet 320 can be any number of types of magnets. For example, in one embodiment the magnet 320 comprises a neodymium permanent magnet. In some embodiments, the magnet 320 can have a width of about 4.35 mm, with a substantially round shape to correspond to the shape of the push button 315. Where the push button 315 takes other shapes, such as ovals, squares, triangles, or hexagons, the magnet 320 can remain round or can have a shape that corresponds to that of the push button 315. In some embodiments, one of the magnetic poles, i.e., the north pole or the south pole, is defined by substantially half of the magnet 320 including a proximal surface 321, which defines the exposed surface of the magnet 320. In such embodiments, the other of the magnetic poles, i.e., the south pole or the north pole, is defined by substantially half of the magnet 320 including a distal surface 322. The proximal surface 321 and the distal surface 322 of the magnet 320 can be planar, as shown in FIG. 3. However, these surfaces can take other shapes as well. For example, proximal surface 321 and the distal surface 322 of the magnet 320 can be convex or concave.

In some embodiments, the shape of the medallion 405 can be complementary to that of the push button 315. For example, in this illustrative embodiment the outer surface 316 of the push button 315 is outwardly curved or convex. Accordingly, the surface 416 of the medallion 405 can be inwardly curved or concave. This provides mating abutment between a surface of the housing 401 and the actuation device 115.

Figure 5:
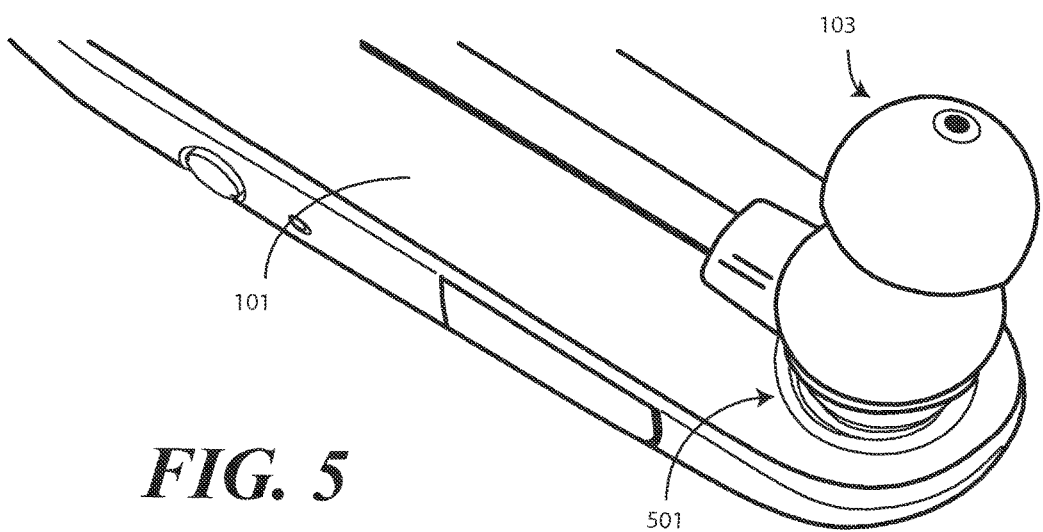
FIG. 5 illustrates an end of a body of an explanatory electronic device with a speaker assembly magnetically coupled to an actuation device in accordance with one or more embodiments of the disclosure.

In the illustrative embodiment of FIGS. 3-4, the push button 315 defining the actuation device 114 is recessed 305 below a surface 306 of the body 101. Accordingly, the push button 315 defines a receiving bay for the speaker assembly 103. Turning now to FIG. 5, illustrated therein is the speaker assembly 103 docked into the receiving bay 501 of the body 101.

Figure 6:
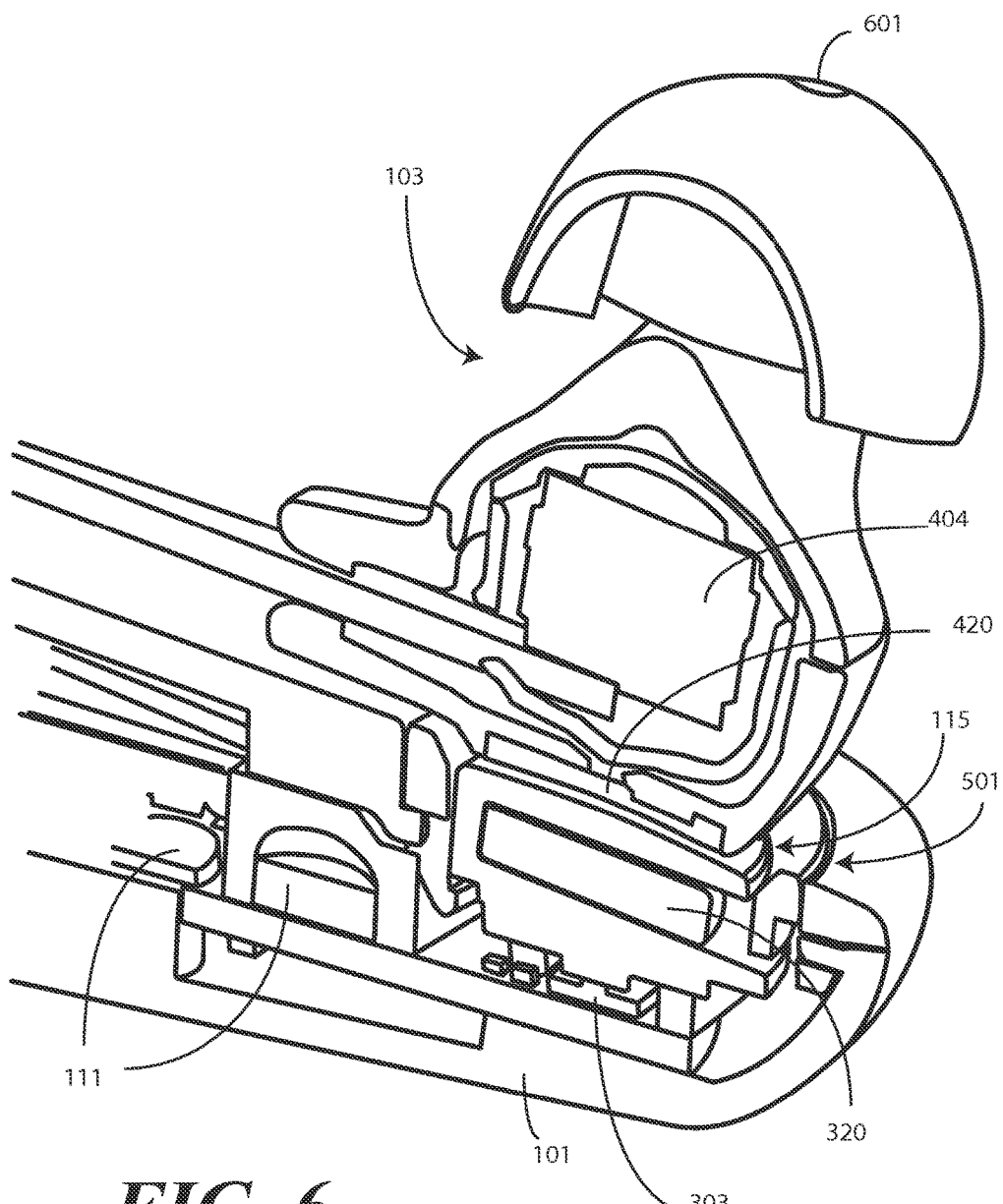
FIG. 6 illustrates a sectional view of a body of an explanatory electronic device with a speaker assembly magnetically coupled to an actuation device in accordance with one or more embodiments of the disclosure.

FIG. 6 illustrates a sectional view of the speaker assembly 103 docked into the receiving bay 501 of the body 101. As shown in FIG. 6, the electronic device 100 includes a body 101 comprising one or more electronic circuits 111. An actuation device 115 is disposed along the body 101 that, when actuated, controls an operation of the one or more electronic circuits 111 by actuation an electromechanical switch 303.

A speaker assembly 103, configured as an ear bud speaker assembly, includes an acoustic driver 404 to direct acoustic energy through a port 601 into a user's ear. The speaker assembly 103 of this embodiment is tethered to the body 101 by an electrical conductor 104. The acoustic driver 404 is operable with the one or more electrical circuits 111 to receive electrical signals, convert those electrical signals to acoustic energy, and deliver that acoustic energy through the port 601 to the user's eardrum. As previously described, the actuation device can comprise a magnet 320. The speaker assembly 103 can then comprise a ferromagnetic material 420 to selectively magnetically couple the speaker assembly 103 to the actuation device 115.

Figure 7:
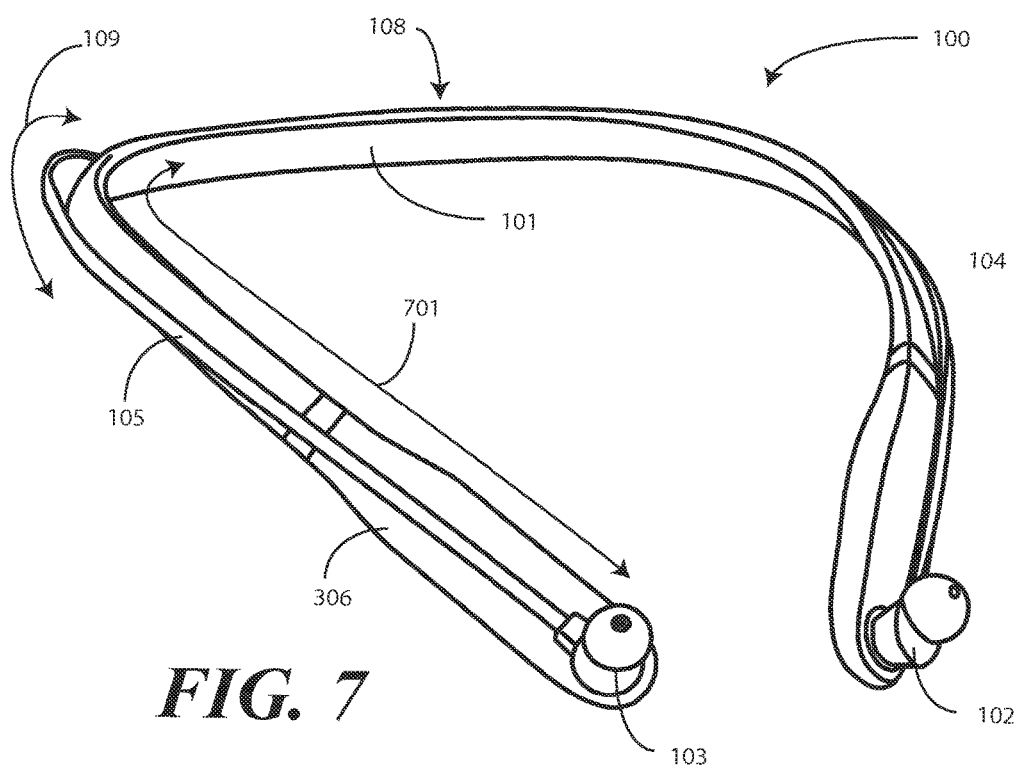
FIG. 7 illustrates an explanatory electronic device with one or more speaker assembly magnetically coupled to one or more actuation devices in accordance with one or more embodiments of the disclosure.

Turning now to FIG. 7, illustrated therein is the electronic device 100 with the first speaker assembly 103 and the second speaker assembly 103 "docked" to the first actuation device (114) and second actuation device (115), respectively. As before, each of the first speaker assembly 103 and the second speaker assembly 103 is tethered 109 to the body 101 by a first electrical conductor 104 and a second electrical conductor 105, respectively. In this illustrative embodiment the first electrical conductor 104 and the second electrical conductor 105 are attached to the rear 108 of the body 101 and extend with a length 701 that is just sufficient to reach the first actuation device (114) and second actuation device (115) so that they rest along a surface 306 of the body 101 for a sleek and stylish look. This length 701 also prevents the electrical conductors 104,105 from getting caught on objects while the first speaker assembly 103 and the second speaker assembly 103 are stowed by magnetically coupling to the first actuation device (114) and second actuation device (115), respectively.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a body comprising:
      one or more electronic circuits; and
      at least one actuation device disposed along the body to, when actuated, affect operation of the one or more electronic circuits, the at least one actuation device comprising a push button; and
   one or more speaker assemblies, operable with the one or more electronic circuits;
   one of the at least one actuation device or the one or more speaker assemblies comprising a magnet; and
   another of the at least one actuation device or the one or more speaker assemblies comprising one of a ferromagnetic material or another magnet to selectively magnetically couple to the one of the at least one actuation device or the one or more speaker assemblies.

2. The electronic device of claim 1, the one of the at least one actuation device or the one or more speaker assemblies comprising the at least one actuation device.

3. The electronic device of claim 2, the another of the at least one actuation device or the one or more speaker assemblies comprising the one or more speaker assemblies.

4. The electronic device of claim 3, the one of the ferromagnetic material or the another magnet comprising the ferromagnetic material.

5. The electronic device of claim 4, the one or more speaker assemblies each comprising an ear bud speaker assembly comprising a housing, the ferromagnetic material disposed along a surface of the housing.

6. The electronic device of claim 5, the ferromagnetic material configured as a medallion on the surface of the housing.

7. The electronic device of claim 6, the ear bud speaker assembly further comprising an ear insertion stem, the medallion disposed opposite the housing from the ear insertion stem.

8. The electronic device of claim 4, the at least one actuation device recessed below a surface of the body to define a receiving bay for a speaker assembly.

9. The electronic device of claim 1, the push button to translate into the body to actuate an electromechanical switch to affect the operation of the one or more electronic circuits.

10. The electronic device of claim 9, the operation comprising one of microphone actuation or audio playback operation.

11. The electronic device of claim 9, the body further comprising compressible foam pad disposed about the electromechanical switch to bias the push button away from the electromechanical switch.

12. The electronic device of claim 1, the one or more speaker assemblies tethered to the body by an electrical conductor.

13. The electronic device of claim 1, the electronic device comprising a wireless headset.

14. The electronic device of claim 1, the push button manufactured from a thermoplastic material.

15. An electronic device, comprising:
   a body comprising:
      one or more electronic circuits;
      a first actuation device and a second actuation device disposed along the body that, when actuated, control an operation of the one or more electronic circuits;
      a first speaker assembly and a second speaker assembly, operable with the one or more electronic circuits;
      one or both of the first actuation device or the second actuation device comprising a magnet; and
      one or both of the first speaker assembly or the second speaker assembly comprising a ferromagnetic material to selectively magnetically couple the one or both of the first speaker assembly or the second speaker assembly to the one or both of the first actuation device or the second actuation device, respectively.

16. The electronic device of claim 15, the one or both of the first speaker assembly or the second speaker assembly comprising ear bud speaker assemblies.

17. The electronic device of claim 16, the body defining a wearable body.

18. The electronic device of claim 17, the one or both of the first speaker assembly or the second speaker assembly tethered to the body with an electrical conductor.

19. The electronic device of claim 17, the wearable body defining a U-shape comprising a first end and a second end, the first actuation device disposed at the first end an the second actuation device disposed at the second end.

* * * * *